(12) United States Patent
Muellers et al.

(10) Patent No.: US 7,631,168 B1
(45) Date of Patent: Dec. 8, 2009

(54) GRAPHICAL INTERFACE FOR GROUPING CONCURRENT COMPUTING UNITS EXECUTING A CONCURRENT COMPUTING PROCESS

(75) Inventors: Peter D. Muellers, Westwood, MA (US); Audrey Benevento, Waltham, MA (US); Kristin Thomas, Framingham, MA (US)

(73) Assignee: The Math Works, Inc., Natick, MA (US)

( * ) Notice: Subject to any disclaimer, the term of this patent is extended or adjusted under 35 U.S.C. 154(b) by 502 days.

(21) Appl. No.: 11/497,871

(22) Filed: Jul. 31, 2006

Related U.S. Application Data

(60) Provisional application No. 60/799,474, filed on May 10, 2006.

(51) Int. Cl.
*G06F 11/30* (2006.01)
(52) U.S. Cl. ...................................................... 712/220
(58) Field of Classification Search ................. 712/220; 715/710, 734, 736, 742, 748, 759
See application file for complete search history.

(56) References Cited

U.S. PATENT DOCUMENTS

| | | | | |
|---|---|---|---|---|
| 6,321,181 | B1 * | 11/2001 | Havens | 703/13 |
| 6,442,241 | B1 * | 8/2002 | Tsumpes | 379/45 |
| 6,877,015 | B1 * | 4/2005 | Kilgore et al. | 707/104.1 |
| 6,938,183 | B2 * | 8/2005 | Bickel | 714/12 |
| 6,938,245 | B1 * | 8/2005 | Spertus et al. | 717/127 |

OTHER PUBLICATIONS

Teo, Yong-Meng, etal., On Grid Programming and MATLAB*G, 2004, Springer-Verlag, 8 pages.*

* cited by examiner

*Primary Examiner*—Eric Coleman
(74) *Attorney, Agent, or Firm*—Lahive & Cockfield, LLP; Kevin J. Canning; John S. Curran

(57) ABSTRACT

A graphical user interface for an interactive concurrent computing environment that conveys the concurrent nature of the computing environment and allows a user to monitor the status of a concurrent process being executed on multiple concurrent computing units is discussed. The graphical user interface indicates the status of groups of instances of the concurrent computing process including whether the instances of the concurrent process are idle, busy or stopped.

25 Claims, 15 Drawing Sheets

Computing Device, 200

Concurrent Computing Unit, 270A

Concurrent Computing Unit, 270B

*Fig. 3B*

```
Command Window                                    400
Target Labs: [All Stopped ▼]  Displayed Labs: [All ▼]
2>> a=4
Lab 2-> a =

4

>>  dbstop in ls
>> ls
16  if iscellstr(varargin)
*K>>  _____  425
```

*Fig. 5B*

Command Window — 400

Target Labs: 2  Displayed Labs: All

```
>> a=3
Lab 1-> a =

3

Lab 2-> a =

3

Lab 3-> a =

3
                    430
2>> a=10
Lab 2-> a =

GRAPHICAL INTERFACE FOR GROUPING CONCURRENT COMPUTING UNITS EXECUTING A CONCURRENT COMPUTING PROCESS

RELATED APPLICATIONS

This application is related to and claims the benefit of a U.S. Provisional Application entitled "Graphical Interface for Monitoring Status of a Concurrent Computing Process" filed on May 10, 2006, Ser. No. 60/799,474 and is related to four co-pending U.S. applications: application Ser. No. 11/497,881 which is entitled "System and Method for Targeting Commands to Concurrent Computing Units Executing a Concurrent Computing Process" and was filed on Jul. 31, 2006; application Ser. No. 11/497,878 which is entitled "Status Indicator for Concurrent Computing Units Executing a Concurrent Computing Process": and was filed on Jul. 31, 2006 application Ser. No. 11/497,871 which is entitled "Graphical Interface for Grouping Concurrent Computing Units Executing a Concurrent Computing Process" and was filed on Jul. 31, 2006 and application Ser. No. 11/594,422 which is entitled "System and Method for Presenting Output From Concurrent Computing Units" and was filed on Nov. 8, 2006.

TECHNICAL FIELD

The present invention relates generally to concurrent computing and more specifically to the grouping of concurrent computing units executing a concurrent computing process in a concurrent processing environment.

BACKGROUND

Engineers, scientists, mathematicians, and educators across a diverse range of industries solve engineering and scientific problems requiring large complex models using computer applications that provide technical computing environments. One such application which provides a technical computing environment is MATLAB®, a product of The MathWorks, Inc. of Natick, Mass. MATLAB® is a high performance language and a technical computing application that provides mathematical and graphical tools for mathematical computation, data analysis, visualization and algorithm development. MATLAB® integrates numerical analysis, matrix computation, signal processing, and graphics in an easy-to-use environment where problems and solutions are expressed in familiar mathematical notation, without traditional programming. MATLAB® is used to solve complex engineering and scientific problems by developing mathematical models that simulate the problem. A model is prototyped, tested and analyzed by running the model under multiple boundary conditions, data parameters, or a number of initial guesses.

As a desktop application, MATLAB® allows scientists and engineers to interactively perform complex analysis and modeling in a familiar workstation environment. However, a single workstation can be limiting due to the size of the problem that can be solved because of the relationship of the computing power of the workstation to the computing power necessary to execute computing intensive iterative processing of complex problems in a reasonable time. As problems require larger and more complex modeling, computations become more resource intensive and time-consuming. For example, a simulation of a large complex aircraft model may take a reasonable amount of time to run once with a specified set of parameters. However, the analysis of the problem may also require the model be computed multiple times with a different set of parameters, e.g., at one-hundred different altitude levels and fifty different aircraft weights, to understand the behavior of the model under varied conditions. This would require five-thousand computations to analyze the problem as desired and the single workstation would take an unreasonable or undesirable amount of time to perform these simulations. Therefore, it is desirable to perform a computation concurrently using multiple workstations when the computation becomes so large and complex that it cannot be completed in a reasonable amount of time on a single workstation.

To address this problem of limited computing power being available on individual systems, applications providing technical computing environments that are traditionally used as desktop applications, such as MATLAB®, may be modified to be able to utilize the computing power of concurrent computing, such as parallel computing. One problem of concurrent computing is that the user interface is based on a single instance implementation of the application. That is, the interface, such as the command line, is generic to both a single instanced computing environment and a multiple instanced concurrent computing environment. Thus the same interface is used regardless of the number of computing units being utilized. This makes it difficult to differentiate the concurrent nature and monitor the status of each individual computing unit in the parallel processing environment. Accordingly, it would be desirable to provide an interface that allows for the differentiating and monitoring of status of computing units in a concurrent processing environment. It would also be desirable to provide an interface that allows a user to target one or more computing units that make up the concurrent computing environment to receive commands.

BRIEF SUMMARY

The illustrative embodiment of the present invention provides a graphical user interface for a concurrent computing environment. The graphical user interface of the present invention conveys the concurrent nature of the computing environment and allows a user to monitor the status of a concurrent process being executed on multiple concurrent computing units. The graphical user interface allows the user to target specific concurrent computer units to receive commands. The graphical user interface also allows the user to target specific concurrent computer units about which the user can receive information about the execution of a concurrent process. The graphical user interface may indicate the status of the concurrent process, the status of the various instances of the concurrent process, or the status of groups of instances including whether the instances of the concurrent process are idle, busy or stopped.

In one aspect of the present invention a method for monitoring the status of a concurrent computing process in an interactive concurrent computing environment having concurrent computing units includes the step of executing multiple instances of a concurrent computing process. Each instance of the concurrent computing process executes in a concurrent computing unit. The multiple instances of the concurrent computing process include at least one interactive instance of the concurrent computing process. The interactive instance accepts input from a user and displays output to the user during execution of the instances of the concurrent computing process. The method additionally receives with a monitoring facility information indicating a current status and/or current activity for each of the multiple concurrent computing units executing instances of the concurrent computing process. The information is used to group each of the concurrent computing units into a group based on the indicated current status and/or current activity indicated by the information. Also, the method displays the results of at least one grouping of the concurrent computing units.

In another aspect of the present invention, a system for monitoring the status of a concurrent computing process in an interactive concurrent computing environment includes multiple concurrent computing units with each concurrent computing unit executing an instance of a concurrent computing process. At least one instance of the concurrent computing process is an interactive instance that accepts input from a user and displays output to the user during execution of the instances of the concurrent computing process. The system also includes a monitoring facility that receives information that indicates at least one of a current status and current activity for each of the multiple concurrent computing units executing instances of the concurrent computing process. The monitoring facility groups the concurrent computing units into groups based on the indicated current status and/or current activity indicated by the information. Additionally, the system includes a graphical user interface that displays the grouping information from the monitoring facility that indicates the current status and/or current activity for each of the multiple concurrent computing units.

In one aspect of the present invention a method for monitoring the status of a concurrent computing process in a concurrent computing environment having concurrent computing units includes the step of monitoring the execution of multiple instances of a concurrent computing process. Each instance of the concurrent computing process executes in a concurrent computing unit. The monitoring identifies information indicating a current status or current activity for each of the concurrent computing units executing instances of the concurrent computing process. The method also displays a graphical user interface that includes and groups the information. The graphical user interface groups at least one of the concurrent computing units into a group based on the indicated current status and/or current activity indicated by the information.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

FIG. 3B is a block diagram of concurrent computing labs on a single computing device;

FIG. 5B depicts the user interface control used to target all concurrent computing units that are stopped at breakpoints;

FIG. 5C depicts the user interface control used to target a specific concurrent computing unit;

FIG. 8B depicts an embodiment wherein the graphical user interface of the present invention provides multiple overlapped windows containing code with indicator arrows showing where computing labs have stopped during execution.

DETAILED DESCRIPTION

The following illustrative embodiments will be described solely for illustrative purposes relative to a MATLAB®-based technical computing environment. Although the illustrative embodiment will be described relative to a MATLAB®-based application, one of ordinary skill in the art will appreciate that the present invention may be applied to parallel or distributed processing of technical computing tasks with other technical computing environments, such as technical computing environments using software products of LabVIEW® or MATRIXx from National Instruments, Inc., or Mathematica® from Wolfram Research, Inc., or Mathcad of Mathsoft Engineering & Education Inc., or Maple™ from Maplesoft, a division of Waterloo Maple Inc.

Figure 1:
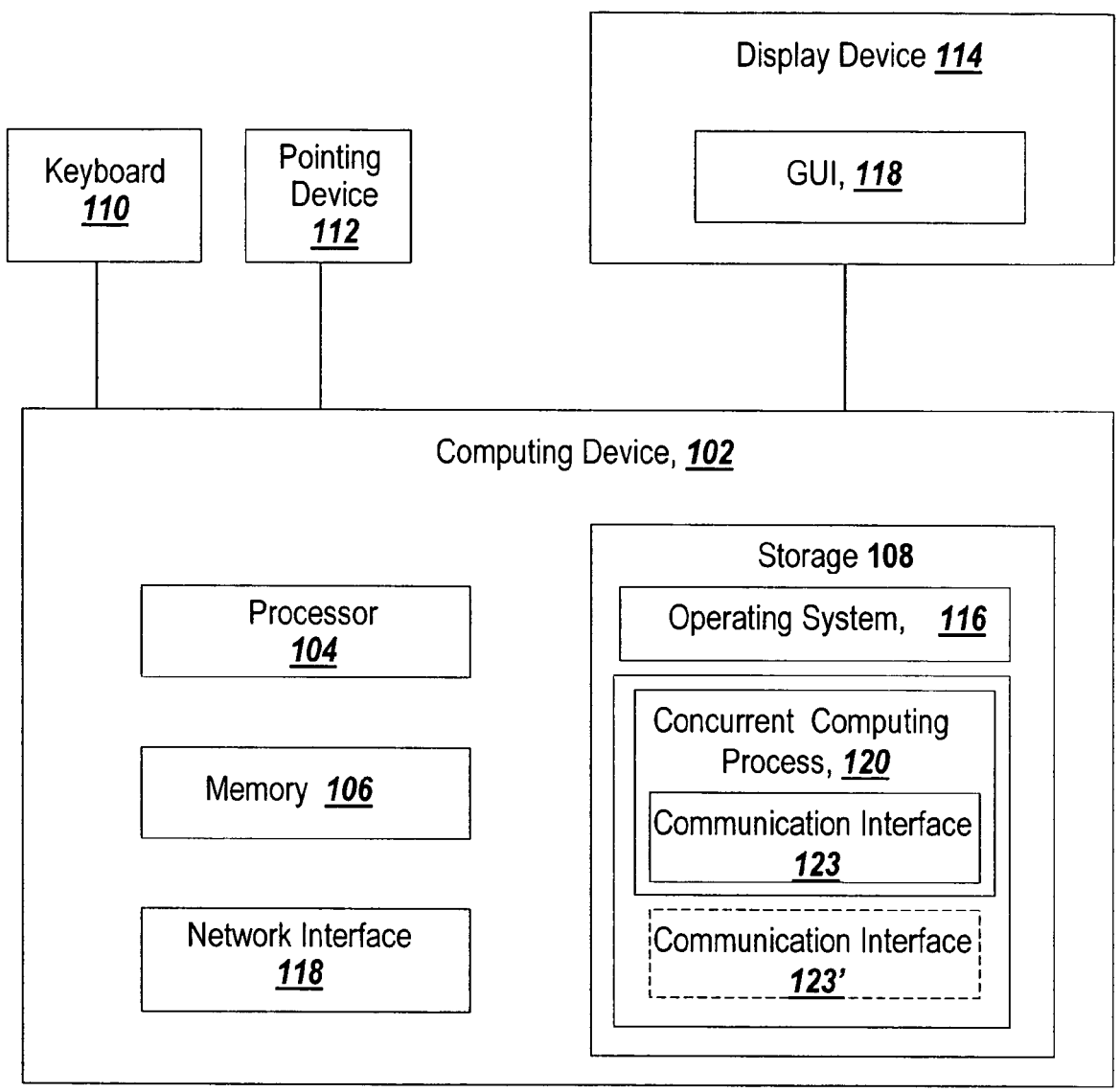
FIG. 1 is a block diagram of a computing device suitable for practicing an embodiment of the present invention.

FIG. 1 depicts a computing device suitable for use with an illustrative embodiment of the present invention. The computing device 102 includes memory 106, on which software according to one embodiment of the present invention may be stored, one or more processors 104 for executing software stored in the memory 106, and other programs for controlling system hardware. Each of the one or more processors 104 can be a single or multiple core processor. Virtualization can be employed in computing device 102 so that infrastructure and resources in the computing device can be shared dynamically. Virtualized processors may also be used with concurrent computing process 120 and other software in storage 108. A virtual machine can be provided to handle a process running on multiple processors so that the process appears to be using only one computing resource rather than multiple. Multiple virtual machines can also be used with one processor. Other computing resources, such as FPGA, ASIC, ASIP, DSP, and GPP, may also be used for executing code and/or software. A hardware accelerator can additionally be used to speed up the general processing rate of the computing device 102. The computing device 102 may also include analog hardware and data acquisition applications.

The memory 106 may comprise a computer system memory or random access memory such as MRAM, DRAM, SRAM, EDO RAM, etc. The memory 106 may comprise other types of memory as well, or combinations thereof. A user may interact with the computing device 102 through a display device 114 such as a computer monitor, which may include a graphical user interface (GUI) 118. The computing device 102 may include other I/O devices such a keyboard 110 and a pointing device 112, for example a mouse, for receiving input from a user. Optionally, the keyboard 110 and the pointing device 112 may be connected to the visual display device 114. The computing device 102 may also include other suitable I/O peripherals such as cameras and microphones and may use neural interfaces. The computing device 102 may further comprise a storage device 108, such as a hard-drive or CD-ROM, for storing an operating system 116 and other related software, and for storing a concurrent computing process 120, such as parallel computing with MATLAB® or distributed computing with MATLAB®. Concurrent computing process 120 can be, but is not limited to, an application, a program, a module, or a script. Concurrent computing process 120 provides a concurrent computing environment to enable concurrent computing on the computing device 102. Concurrent computing process 120 can also include a communication interface 123, such as Message Passing Interface (MPI), CORBA or other suitable interface, for setting up a communication channel with another computing device to form a collaboration. MPI is a standard for an interface for message passing that has been used between parallel machines or workstations in concurrent computing systems. One of ordinary skill in the art will appreciate that communication interface 123 can be adapted to be included as part of the concurrent computing process 120, or it can be a stand-alone application, module, script, or program that responds to calls from concurrent computing process 120, such as communication interface 123'. Additionally, the operating system 116 and concurrent computing process 120 can be run from a bootable CD, such as, for example, KNOPPIX®, a bootable CD for GNU/Linux.

Additionally, the computing device 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may be a FireWire interface, FlexRay interface, RS-232 interface and may include a built-in network adapter, network interface card, PCMCIA network card, card bus network adapter, wireless network adapter, USB network adapter, modem or any other device suitable for interfacing the computing device 102 to any type of network capable of communication and performing the operations described herein. Moreover, the computing device 102 may be any computer system such as a workstation, desktop computer, server, laptop, handheld computer, sensor, actuator or other form of computing or telecommunications device that is capable of communication and that has sufficient processor power and memory capacity to perform the operations described herein.

The computing device 102 can be running any operating system such as any of the versions of the Microsoft® Windows® operating systems, the different releases of the UNIX and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein.

Figure 2:
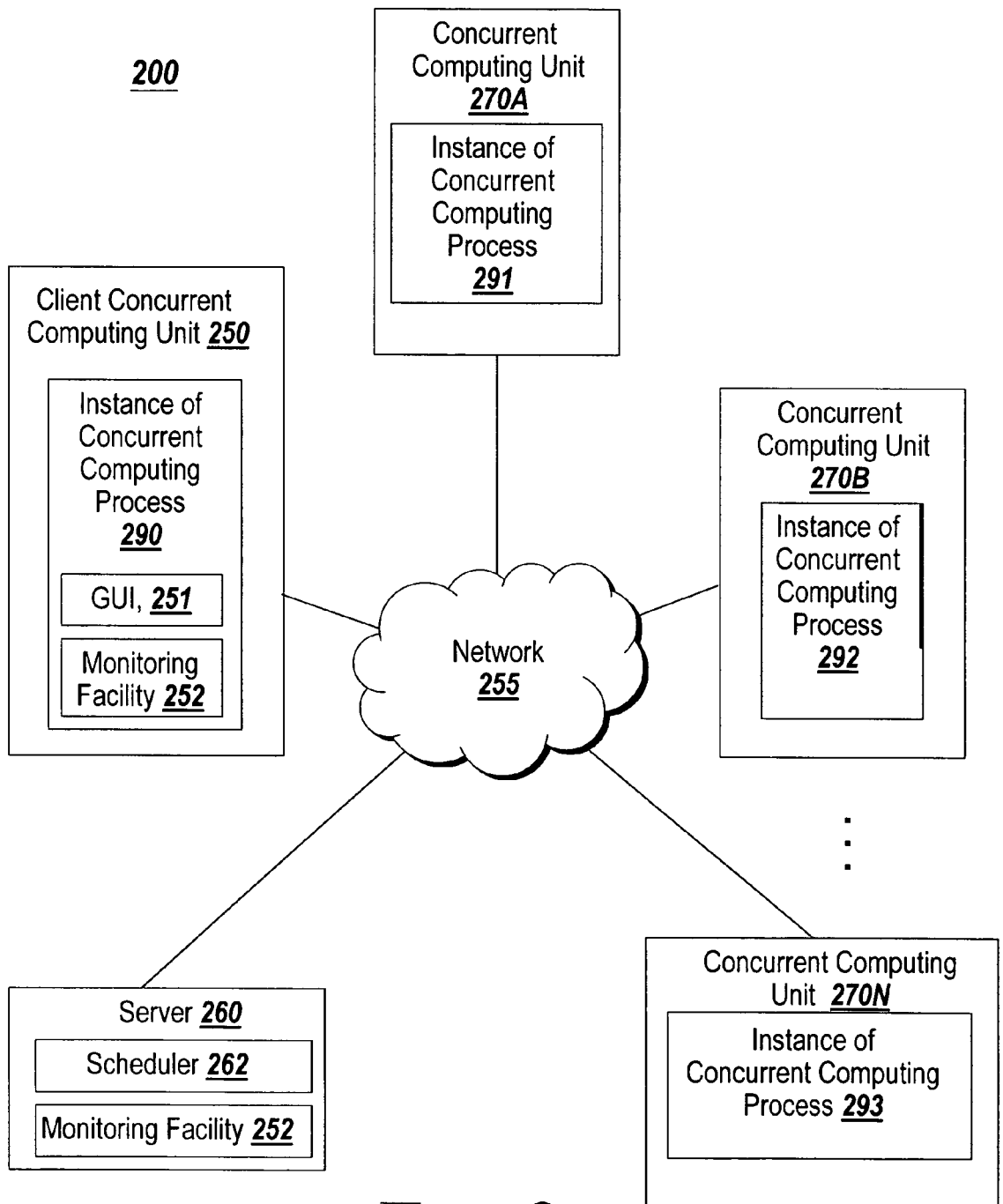
FIG. 2 is a block diagram of a concurrent computing system including more than one computing device for practicing an embodiment of the present invention.

FIG. 2 depicts a concurrent computing system 200 that is suitable for practicing the illustrative embodiment of the present invention. In brief overview, the concurrent computing system 200 includes a client concurrent computing unit 250, concurrent computing units (which are also referred to as labs herein) 270A-N, and optionally a server 260. A concurrent computing unit or lab is a computing resource that performs distributed computing or parallel computing. A computing resource can be a processor, a computer system, or other hardware or software with computational capabilities. The client concurrent computing unit 250 is in communication with the concurrent computing units 270A-N and server 260 through the network 255. One of ordinary skill in the art will appreciate that concurrent computing units 270A, 270B . . . 270N may be located on the same or different computing resources.

The client concurrent computing unit 250 and concurrent computing labs 270A-N are configured to perform distributed computing or parallel computing using a concurrent computing process 120. The concurrent computing process 120 may be a technical computing software application that provides a technical computing and/or graphical modeling environment for generating block diagram models and to define mathematical algorithms for simulating models. The concurrent computing process may include all or a portion of the functionality provided by the stand-alone desktop application of MATLAB®. Each concurrent computing unit 250 and 270A-N executes an instance 290, 291, 292 or 293 of the concurrent computing process 120. For example, each concurrent computing unit 270A to 270N and the client concurrent computing unit 250 may each be executing a different copy of MATLAB from The MathWorks, Inc. of Natick, Mass. The instance of the concurrent computing process 290 executed on the client concurrent computing unit 250 differs from the instances of the concurrent computing processes 291, 292 and 293 in that it also includes a graphical user interface 251 and is an interactive instance of the concurrent computing process. The interactive instance of the concurrent computing process is able to accept input from a user and display output to the user during the execution of the instances of the concurrent computing process. The graphical user interface 251 displays the information collected by a monitoring facility 252. The graphical user interface 251 allows a user accessing the client 150 to control and monitor all of the executing instances 290, 291, 292 and 293 of the concurrent computing process.

The instance of the concurrent computing process 290 executed by the client concurrent computing unit 250 may also include the monitoring facility 252. Alternatively, the monitoring facility 252 may be part of, or in communication with, the scheduler 260. The monitoring facility 252 is in communication with the client concurrent computing unit 250 and the concurrent computing units 270A, 270B . . . 270N and tracks the current activity and status of each concurrent computing unit.

In one aspect of the present invention, functions can be defined, by the client concurrent computing unit 250 with an application programming interface (API) and/or programming language, representing a technical computing task to be executed by either a technical computing environment local to the client 150, or remotely on the workstations 270A-N. The graphical user interface may be built on top of the API layer. Tasks can be declared on the client concurrent computing unit 250 and additionally organized into jobs. A job is a logical unit of activities, or tasks that are processed and/or managed collectively. A task defines a technical computing command, such as a MATLAB® command, to be executed, and the number of arguments and any input data to the arguments. A job is a group of one or more tasks.

In one aspect of the present invention, a task can be directly distributed by the client concurrent computing unit 250 to one or more computing resources, such as concurrent computing units 270A-N. A computing resource performs technical computing on a task and may return a result to the client concurrent computing unit 250.

In another aspect of the present invention, the system 200 includes a server 260 on which a scheduler 262 runs. The scheduler 262 can be a scheduler provided with concurrent computing process 120, a generic scheduler, or a third-party scheduler that is designed and provided by a company or individual that does not provide concurrent computing process 120. For example, given that concurrent computing process 120 is parallel computing with MATLAB® by The MathWorks, Inc. of Natick, Mass., a third-party scheduler can be MPI Exec, LSF, Condor, Microsoft Compute Cluster Server, or PBS. The server 260 communicates over the network 22 to the concurrent computing units 270A-N and the client concurrent computing unit 250. One of ordinary skill in the art will appreciate that any of the concurrent computing units 270A-N may include more than one technical computing lab to practice the present invention. Additionally, client concurrent computing unit 150 and server 260 may also include one or more concurrent computing labs.

The scheduler 260 includes one or more application software components to provide for the automatic distribution of tasks from the client concurrent computing unit 250 to one or more of the concurrent computing units 270A-N. The scheduler 260 allows the client concurrent computing unit 250 to delegate the management of task distribution to the scheduler 260. The scheduler may also set up for client concurrent computing unit 250 the concurrent computing units 270A-N by using the information received from the client concurrent computing unit 250 regarding the number of concurrent computing labs needed and other configuration information. Hence, the client concurrent computing unit 250 does not need to know the specifics of the concurrent computing units 270A-N. The client concurrent computing unit 250 can define a function to submit the task to the scheduler 260, and get a result of the task from the scheduler 260. As such, the scheduler 260 provides a level of indirection between the client concurrent computing unit 250 and the concurrent computing unit 270A-N.

The use of a scheduler eases the distributed programming and integration burden on the client concurrent computing unit 250. The client concurrent computing unit 250 does not need to have prior knowledge of the availability of the concurrent computing units 270A-N. For multiple task submissions from the client concurrent computing unit 250, the scheduler 260 can manage and handle the delegations of the tasks to the concurrent computing units 270A-N and hold the results of the tasks on behalf of the client concurrent computing unit 250 for retrieval after the completion of technical computing of all the tasks distributed by client concurrent computing unit 250. In an alternative implementation, the concurrent computing units 270A-N may provide to client concurrent computing unit 250 directly the results of the tasks assigned to concurrent computing labs 270A-N by the scheduler 260. The scheduler 260 can further include an object-oriented interface to provide control of delegating tasks and obtaining results in the system 200. The scheduler 260 also provides an interface for managing a group of tasks collectively as a single unit called a job, and on behalf of a client concurrent computing unit 250, submitting those tasks making up the job, and obtaining the results of each of the tasks until the job is completed. One of ordinary skill in the art will recognize that the functions and operations of the scheduler 260 can be separated into various software components, applications and interfaces. Additionally, the functions and operations of the scheduler 260 may reside on either the client concurrent computing unit 250 or one of the concurrent computing units 270A-N instead of the server 260.

Additionally, each of the client concurrent computing unit 150, the server 260, and the concurrent computing units 270A-N can be running the same or different operating systems with the same or different processors. For example, the client concurrent computing unit 150 can be running Microsoft® Windows®, the server 260 can be running a version of UNIX, and the concurrent computing units 270A-N a version of Linux. Alternatively, each of the client concurrent computing unit 150, the server 260 and the concurrent computing units 270A-N can be running Microsoft® Windows®. One of ordinarily skill in the art will recognize the various combinations of operating systems and processors that can be running on any of the computing devices (client 150, server 260, concurrent computing units 270A-N).

Figure 3A:
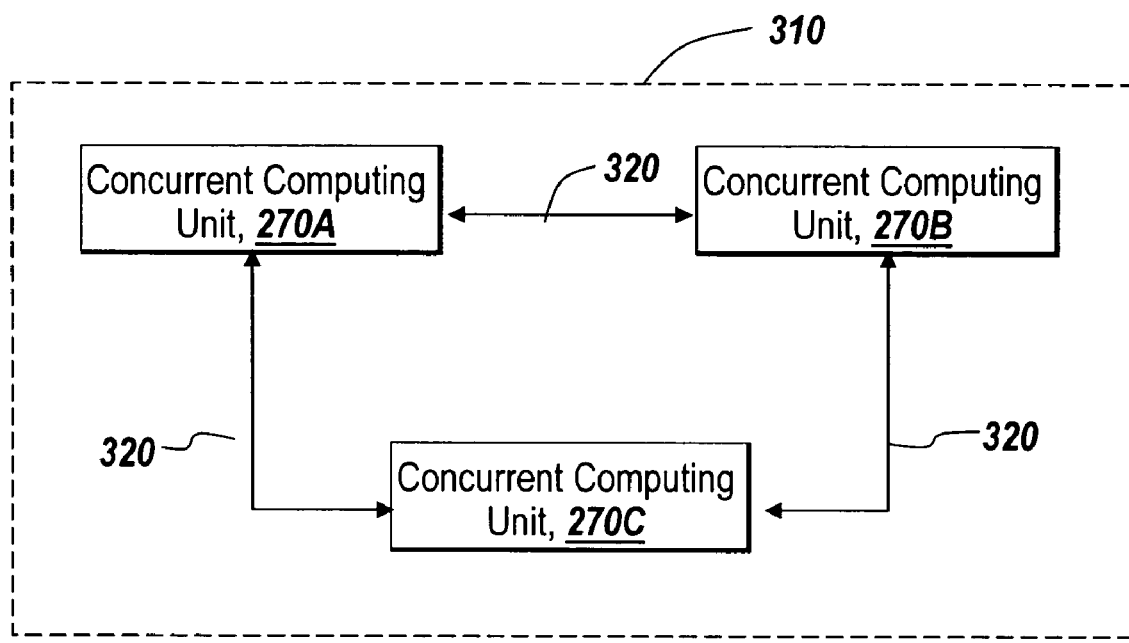
FIG. 3A is a block diagram illustrating a collaboration of concurrent computing labs in the illustrative embodiment of the present invention.

FIG. 3A illustrates a collaboration of the concurrent computing units 270A, 270B, and 270C. Here, the concurrent computing units 270A, 270B, and 270C establish a communication channel 320 and form a collaboration 310. The concurrent computing labs 270A, 270B, and 270C may communicate via an MPI communication channel 320. In other embodiments, the concurrent computing units 270A, 270B, and 270C can interface via socket-based communications over TCP/IP implementing a custom message specification. In further embodiments, the concurrent computing units 270A, 270B, and 270C may communicate using any available messaging communications products and/or custom solutions that allow the sending and receiving of messages among the concurrent computing units 270A, 270B, and 270C. One of ordinary skill in the art will recognize the various types of interfaces to configurations among the concurrent computing labs 270A, 270B, and 270C.

In one embodiment, the collaboration 310 is dynamic. In other words, a user can modify or change the size of the collaboration by adding another computing resource. On the client concurrent computing unit 150, the user may be provided with a graphical user interface to modify or change the size of the collaboration or designate a specific resource to add or remove from the collaboration. In another embodiment of the present invention, the client concurrent computing unit 150 can forward the collaboration information to the scheduler 260, which will determine a concurrent computing lab to be added or removed from the collaboration.

FIG. 3B illustrates a tightly coupled environment that is suitable for practicing the present invention. Computing device 200 includes a first concurrent computing lab 270A and a second concurrent computing lab 270B. In this embodiment, a parallel computing unit may be a processor, a multiple core processor, multiple processors, or other hardware or software components with computational capability, such as a microcontroller, virtual machine application specific integrated circuit, analog hardware or field-programmable gate arrays.

In one embodiment, the present invention provides a graphical user interface 251 for monitoring the status of instances of a concurrent computing process 290, 291, 292 and 293. The monitoring facility 252 is in communication with the concurrent computing units and is kept apprised of the status of the labs 250 and 270A-N. In one implementation, the monitoring facility may first register with each of the concurrent computing labs prior to receiving any information. As noted previously, the monitoring facility may also be part of, or in communication with, the scheduler 262. The monitoring facility may store the information in a global list or other type of data structure. Using the status information the graphical user interface 251 of one embodiment of the present invention is generated to provide a visual indication of the status of the executing concurrent computing process. Possible embodiments of such a graphical user interface include but are not limited to providing a command prompt that displays the status of the concurrent computing process, a user interface control for targeting selected labs (270A-N), a simultaneous integrated view of the status of multiple labs (270A-N) of the concurrent process, a simultaneous integrated view of the status of multiple labs (270A-N) of the concurrent process wherein the labs (270A-N) are grouped and displayed according to the status of each lab, and graphical indicators that depict where multiple computing units or labs have stopped during execution.

In one aspect of the present invention, the graphical user interface 251 includes a command window prompt capable of displaying the status of an executing concurrent computing process such as a parallel process. Most command line interfaces have a static prompt that does not change based on the status of the application. In the present invention, the command prompt changes to show not only the status of one application, but of several instances of a concurrent computer application 290, 291, 292 and 293 running concurrently.

An example of the type of prompt that may be displayed in the graphical user interface 251 of the present invention is the MATLAB® command window prompt. The MATLAB® command window prompt is used both to display the MATLAB® engine status and provide the means for the user to enter commands. The present invention allows a single prompt to continue to be used in concurrent computing environments such as environments executing a version of MATLAB® with concurrent computing capability, where multiple MATLAB®s are run on multiple concurrent computing units.

For example, the MATLAB® Parallel command window prompt may be used to show the collective status for all lab windows when all labs are targeted by entered commands, show the status of a single lab when a single lab is the target of entered commands, and show the status of a subset of labs when a subset is the target of entered commands. Possible examples of such prompts for can be seen in the table below:

| MATLAB state | Targeted Lab | Prompt indicator |
|---|---|---|
| All idle | All | P>> |
| All idle | Any one Lab | #>> |
| All busy | All | NULL prompt |
| All busy | Any one Lab | NULL Prompt |
| One MATLAB busy/ the rest idle | All | NULL prompt |
| One MATLAB busy/ the rest idle | Any one Lab | Prompt state for the targeted lab: NULL or #>> |
| More than one MATLAB busy/Some idle | All | NULL prompt |
| More than one MATLAB busy/Some idle | All or any one Lab | Prompt state for the targeted lab: NULL or #>> |
| All stopped at breakpoint | All Stopped | PK>> |
| All stopped at breakpoint | One stopped lab | #K>> (Prompt state for the targeted lab) |
| All stopped at breakpoint | One idle or busy lab | Prompt state for the targeted lab: NULL or #>> |
| More than one MATLAB stopped at breakpoint | All Stopped | *K>> |
| More than one MATLAB stopped at breakpoint | One stopped lab | #K>> (Prompt state for the targeted lab) |
| More than one MATLAB stopped at breakpoint | One idle or busy lab | Prompt state for the targeted lab: NULL or #>> |

As an example, the idle prompt may be "P>>" where the "P" designates parallel mode. By default, commands go to (target) all labs when MATLAB® is in parallel mode. Traditionally, the MATLAB® prompt has been used to reflect state. The prompt disappeared when the computing unit became busy and became "K>>" when expecting keyboard input such as when the process was at a breakpoint. In parallel mode, the prompt will still disappear (empty or NULL prompt) when a command is issued and does not return until all of the targeted labs are idle. In debug mode, a "PK>>" prompt may be used show when all Labs are targeted and stopped at a breakpoint and a "*K>>" prompt is used to show when all labs are targeted and only some of the labs are stopped at a breakpoint.

In cases when a single lab is targeted, the number (#) of the lab may be shown in the idle and debug prompts. Thus if lab '3' is targeted, the prompt may be "3>>" (or "3K>>" to indicate that one lab is targeted and is stopped at a breakpoint in debug mode). The prompt does not show a lab number in the debug prompt unless a single lab is specified as the target and it is in debug mode. An "*" may be used when multiple labs are targeted (but not all are stopped at breakpoints) to remove any confusion about where commands are targeted. The lab number is only added to the prompt when a single lab is specified as the target. In some embodiments the status for a targeted group may also be displayed so that the # designator may be a range such as "1:3" for labs '1', '2' and '3', and groups such as "5, 7, 12" or the like. The user is also able to target the client concurrent computing unit by temporarily suspending parallel mode by changing the prompt manually or by entering ctrl-Enter (or similar keystrokes) so that the commands are directed to the client lab. It will be appreciated that the symbols discussed above are given for the purposes of illustration and that many symbols may be used with the prompt in place of or in addition to those discussed herein without departing from the scope of the present invention.

The ability to target all labs or a subset of labs provides the user increased control over the concurrent computing environment. For example, the user entering the command:

P>> dbstop in myfunc at 307 will cause each lab to set this breakpoint at line 307 of a section of code that is being debugged. When a lab reaches this breakpoint, it will stop. Other labs will continue until they reach the breakpoint (if at all). Similarly, a command may specify a global stop so that when any lab hits a breakpoint all labs are halted. Likewise, the command prompt may also be used to set a barrier breakpoint so that labs at a barrier breakpoint ignore "dbstep" and "dbcont" commands until all labs have reached the breakpoint.

In certain embodiments audible or tactile identifiers may also be associated with the status indicated by the command prompt. In other embodiments, graphics or animations may be used as part of the status information in the command prompt. Thus, in one implementation, the command prompt may be a text box in which the user enters commands. The status of the concurrent computing units may be displayed in the text box by altering the color, outline, background or some other feature of the text box. Other possible implementations and configurations will be apparent to one skilled in the art given the benefit of this disclosure. For example, in one aspect of the present invention, a user may hover with a mouse or other pointer over a concurrent computing unit in a list of active concurrent computing units. The hovering may result in the appearance of a command line window into which the user can enter commands. In another aspect of the present invention, the hovering results in the appearance of an URL identifying the concurrent computing device. A user clicking on the URL receives additional information regarding the device.

Figure 4:
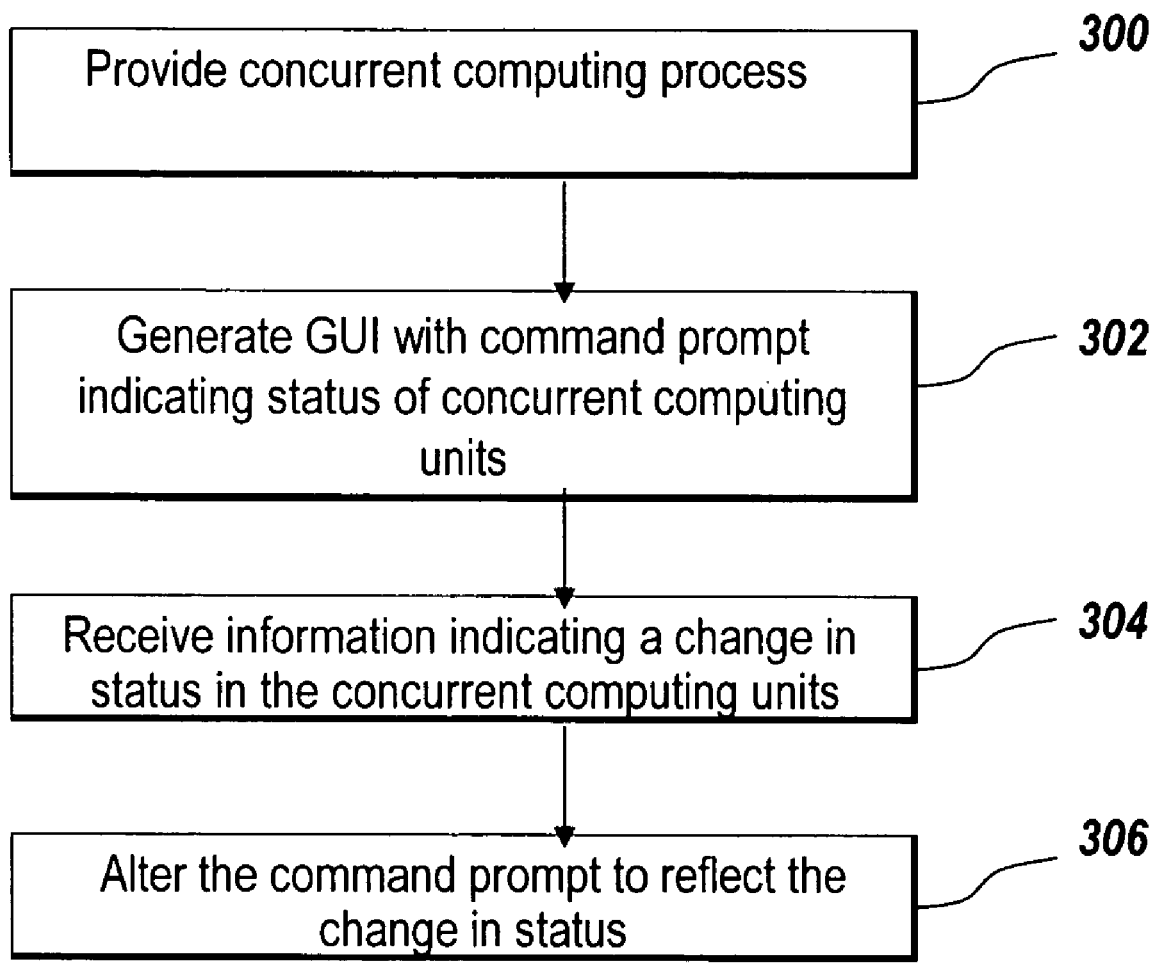
FIG. 4 is a flowchart of a sequence of steps that may be followed by the illustrative embodiment of the present invention to inform the user of a change in status of one or more concurrent computing units using a command prompt.

As noted above, the form of the command prompt in the present invention provides the user with information indicating the status of the concurrent computing units. The process by which the command prompt is used to convey information regarding the change in status for the concurrent computing unit(s) to the user is depicted in the flowchart of FIG. 4. FIG. 4 depicts a sequence of steps that may be followed by the illustrative embodiment of the present invention to inform the user of a change in status of one or more concurrent computing units by altering the form of a command prompt. The sequence begins with the provision and execution of a concurrent computing process (step 300). A GUI is generated that includes a command prompt that indicates, through the displayed form of the command prompt, the status of the concurrent computing units that are executing the concurrent computing process (step 302). Information is then received regarding a change in status of at least one of the concurrent computing units (step 304) and the command prompt is altered to reflect the change in status (step 306).

In another embodiment, the graphical user interface includes a user interface control, such as a pull down menu or the like, that allows a user to target one or more computational units of a concurrent computing process. Once one or more units have been targeted, any command issued will be directed to the target unit(s).

Figure 5A:
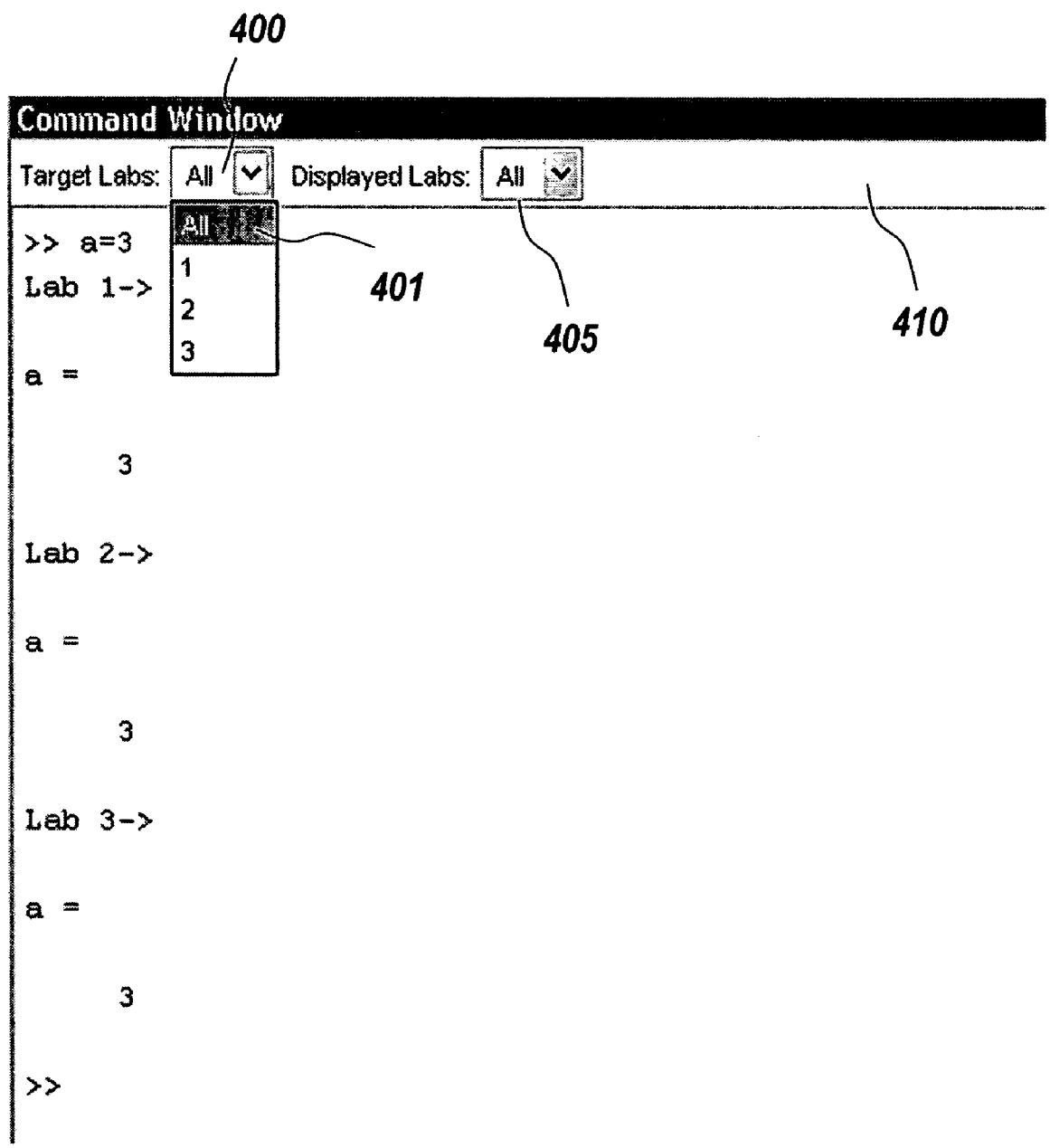
FIG. 5A depicts a user interface control in the graphical user interface being used to target all concurrent computing units.

The graphical user interface 251 provides a means for the user to target and send commands to a subset of labs 250 and 270A-N and to monitor the status of those labs. The graphical user interface may include a menu item or widget 400 that allows the user to define the target lab(s) for commands he or she enters. An example of this can be seen in FIGS. 5A-C. In FIG. 5A, the target selection widget 400 is a combo box displayed in the toolbar 410. If the user sets the combo box 400 to target 'All' 401 then any commands typed at the command line will be sent to all labs. FIG. 5A shows the target set to all labs. The graphical user interface shows the results from a command sent to all labs. A second combo box 405 indicates that all of the labs are being displayed.

When any of the labs are in debug mode, the user will be able to target any single Lab or "All Stopped" at breakpoints. An example of this can be seen in FIG. 5B (in this case, the "*K>" prompt 425 shows that only some of the labs are stopped). At any time, the user can target any single lab by selecting it from the combo box 400. The prompt will change to show that the targeted lab is a single lab. The commands will only be sent to the single targeted lab. This is shown in FIG. 5C where the combo box 400 indicates that lab '2' has been selected to receive commands and the prompt 430 changes accordingly.

In certain implementations the user may have the ability to target a subset of Labs (for example, 2:4 typed into the combo box target widget to specify Labs '2', '3' and '4') instead of just choosing 'all' or single labs. The menu bar may also provide the ability to direct the graphical user interface to only display the interactions with specific labs which may also be performed using a user interface control. In some embodiments keybindings may also be used in conjunction with other controls. For example, key combination "Ctrl-Enter" could be a keybinding to select the client (regardless of the target specified in the new widget). This allows the user to switch the command target by clicking on the target selection widget or by using the keybinding. Similarly labs may be targeted by using key combinations. It will be understood that these examples are but some of the possible embodiments. Other configurations and implementations for the menu item will be apparent to one skilled in the art given the benefit of this disclosure.

Figure 5D:
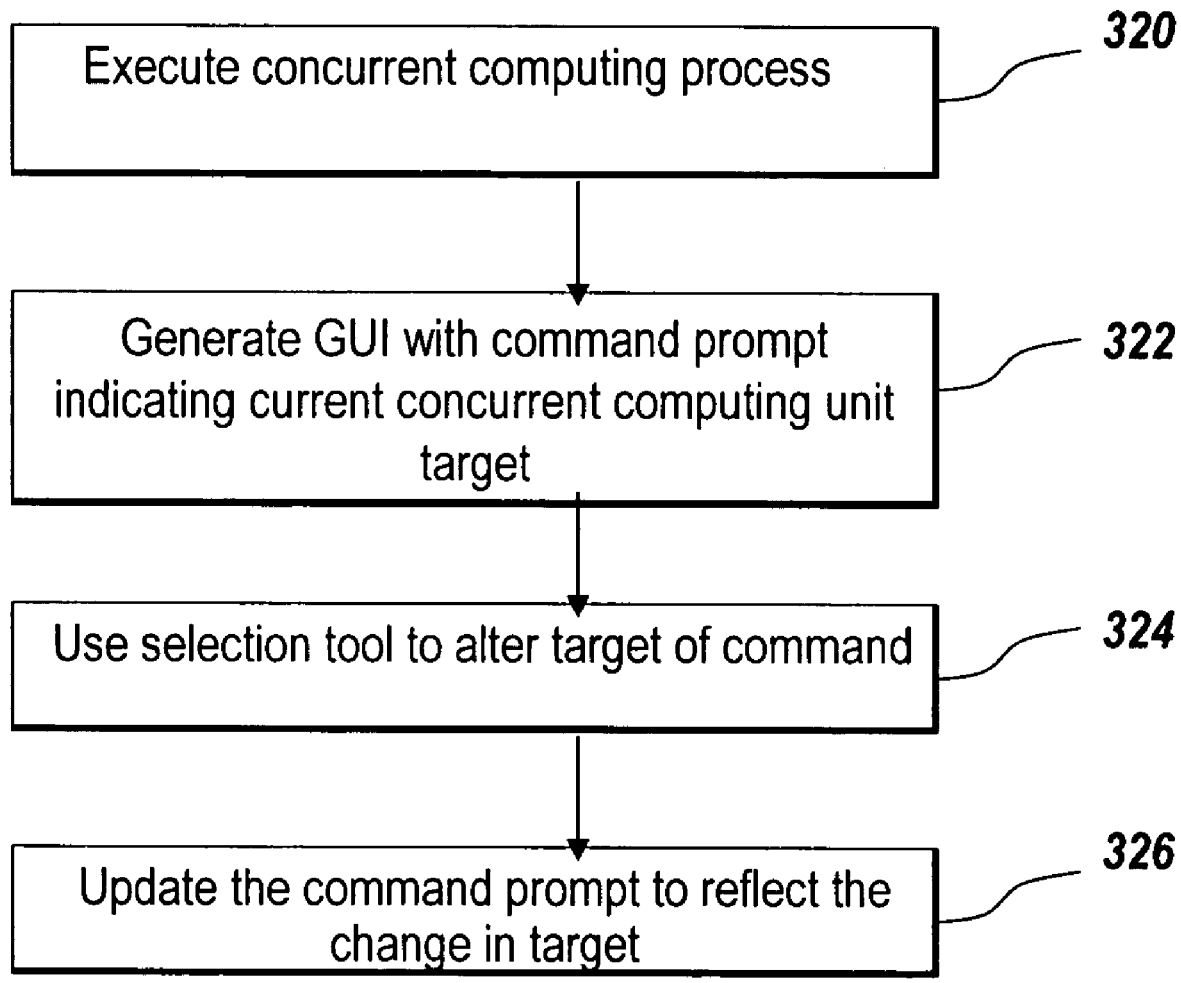
FIG. 5D is a flowchart of a sequence of steps that may be followed by the illustrative embodiment of the present invention to alter the command prompt so as to target specific concurrent computing units.

FIG. 5D depicts an exemplary flowchart of a sequence of steps that may be followed by the illustrative embodiment of the present invention to use the selection tool to alter the target for a user command. The sequence begins with the execution of a concurrent computing process (step 320). A GUI is generated that includes a command prompt that indicates a current target for any user-entered commands (step 322). The selection tool is then used to alter the target (step 324). The selection tool may be a combo-box, keystroke combination or some other type of user interface control. Following the alteration of the target, the form of the command prompt is updated to reflect the new target.

In another aspect of the present invention, the provided graphical user interface includes a simultaneous integrated view of the status of multiple concurrent computing units of the concurrent process. In one implementation, the status information for the concurrent computing units is provided in a table format which displays the current status of the multiple units as the process is executed. The use of a simultaneous integrated view allows for convenient monitoring of status or activity of multiple units, labs, or processors that are cooperatively performing a computation in an interactive environment. An interactive computational environment is one which accommodates, but does not require, the presence of a user while computation is occurring. A useful accommodation is to display the status or activity of each unit, lab or processor on a single display. Examples of status or activity values include idle (no work to do), busy performing a computation, busy sending data to another processor, busy receiving data from another processor and stopped at a known execution point. Additional information not initially displayed in the graphical user interface such as the information referenced above or statistics related to recent activity such as the percentage of time spent waiting to receive data from another processor or the number of times data was sent to another processor may be accessed through a link or reference included in the graphical user interface. Similarly, statistical plots of the additional information may be generated as a result of a user selecting a reference or link in the graphical user interface. Such information can be used for tracking the progress of a computation and for assessing the performance of the computational system and the algorithms being employed.

Figure 6A:
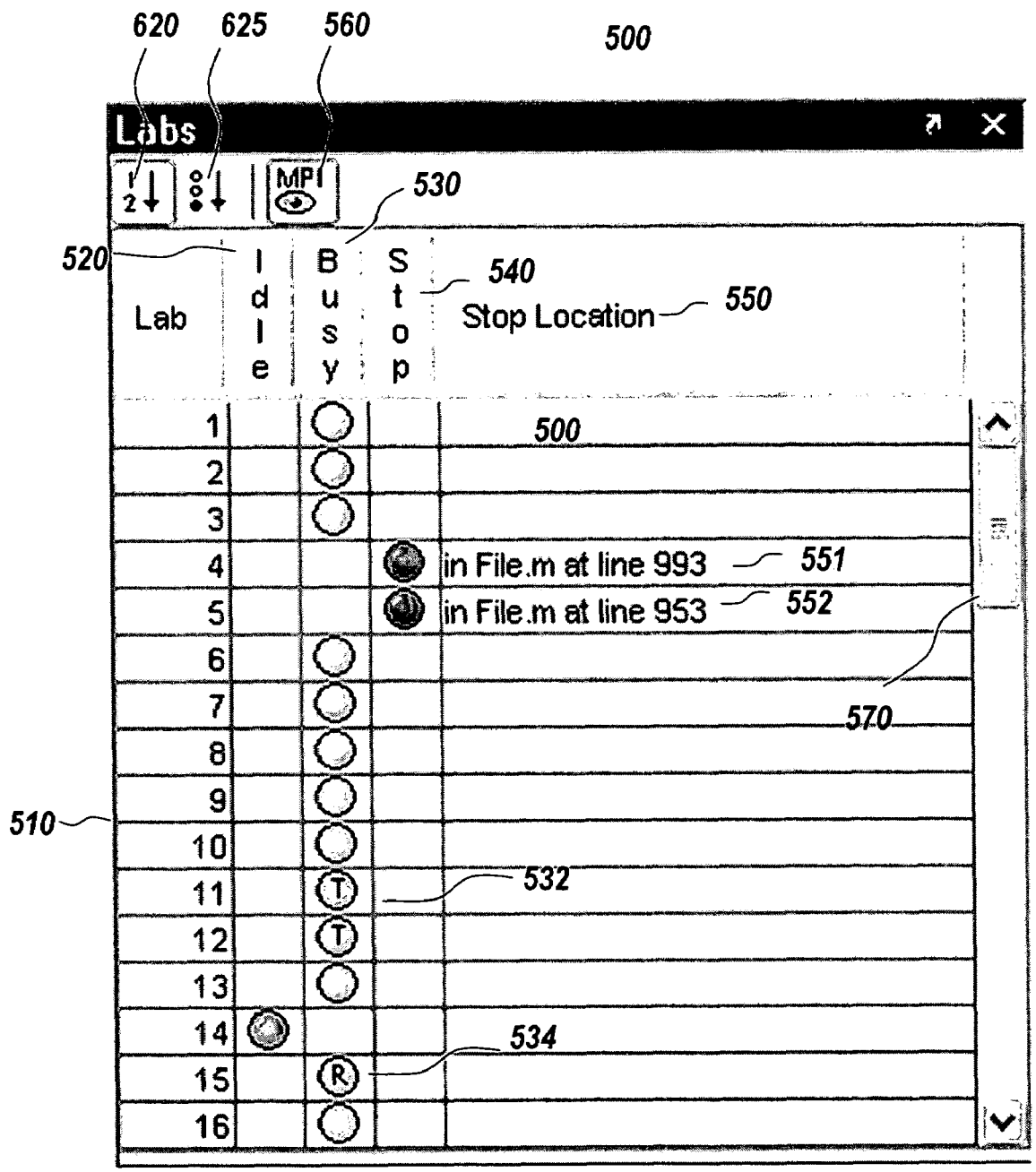
FIG. 6A depicts the graphical user interface of the present invention reflecting a tabular view of the status of the concurrent computing units.

FIG. 6A shows a tabular implementation of this invention in the form of a table 500 listing the status of each computing unit or lab. The table columns display the status of multiple labs 510 including indicators of whether the lab is idle 520, busy 530 or stopped 540. The table 500 also lists where in the code that is being executed the lab has stopped 550. For example, the lab 500 indicates that the lab '4' has stopped at line 993 (551) and the lab '5' has stopped at line 953 (552). In the case of busy labs the table may also display whether or not the lab is transmitting (T) 532 or receiving (R) 534 using MPI. In some embodiments the display of the MPI information may be turned on or off using a user interface control such as button 560. The table 500 of FIG. 5A shows the status of 64 computing units (referred to as labs in the figure) in a list.

Only the first 16 instances are visible in the figure. The balance can be accessed by scrolling with a provided control 570.

The table 500 may also be extended to include additional columns with other statistics. In some embodiments, the table may serve as a gateway to more detailed information such as statistical plots. Conventional mechanisms such as double clicking or making a selection from a context menu would provide access to the detailed information. A subset of the concurrent computing units may be differenced so as to compare a subset of concurrent computing units to compare the length of time the units ran, the resources used, how long the units took to process certain elements of a job and other types of comparisons. Additionally, the collection of data indicating active concurrent computing units may be programmatically evaluated and further processed before being presented to a user. Other implementations or configurations will be apparent to one skilled in the art given the benefit of this disclosure.

Figure 6B:
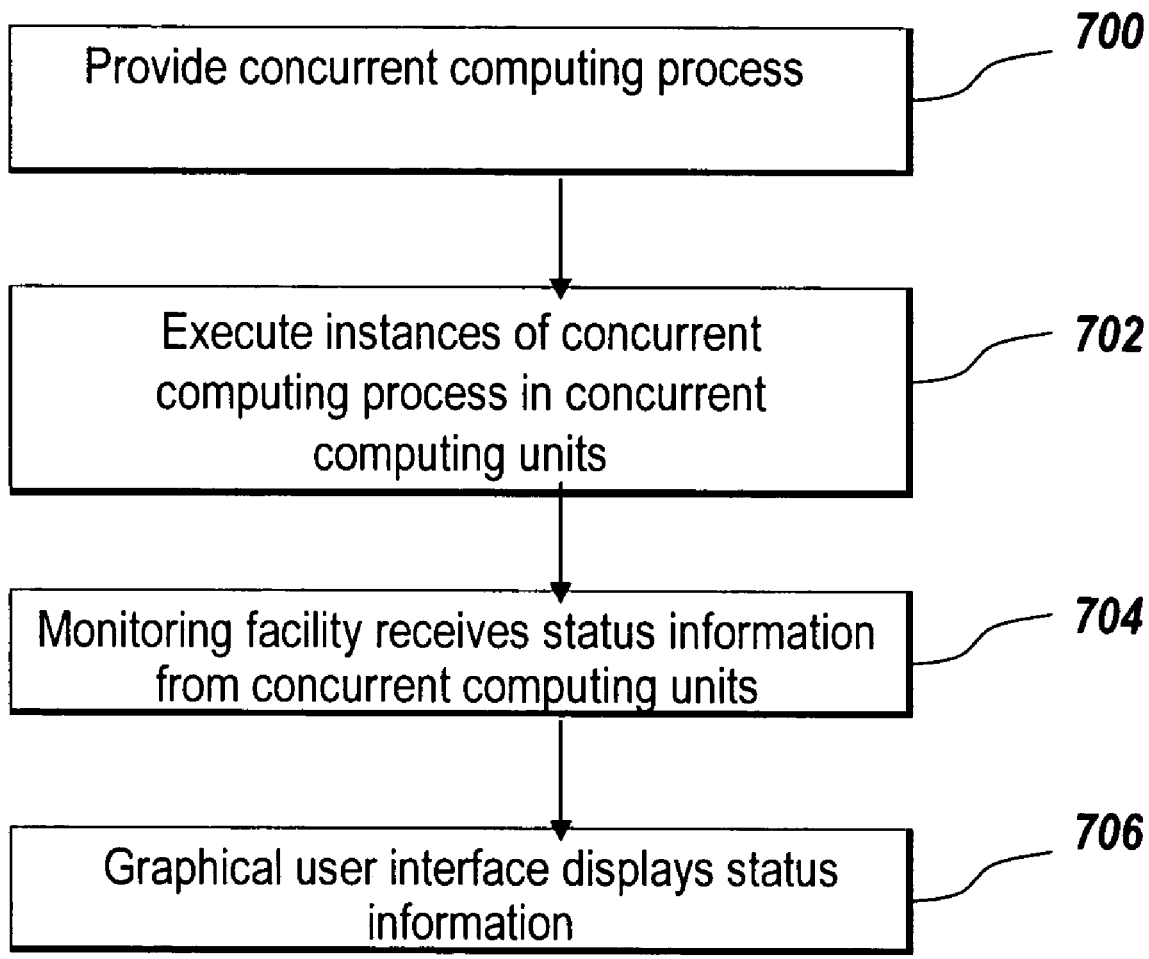
FIG. 6B is a flowchart of the sequence of steps by which the table of FIG. 5A is generated.

FIG. 6B is a flowchart of a sequence of steps that may be utilized by the illustrative embodiment of the present invention to display the current status of concurrent computing units. The sequence begins by providing a concurrent computing process (step 700). An exemplary concurrent computing process is PARALLEL MATLAB™. A plurality of instances of the concurrent computing process is then executed in a plurality of concurrent computing units with each concurrent computing unit executing a separate instance (step 702). A monitoring facility 252 receives periodic or continual updates as to the status of the concurrent computing process being executed in each concurrent computing unit (step 704). A graphical user interface is then generated to display the status information for each concurrent computing unit (step 706).

A single display that shows the status or activity of each lab can be useful for tracking the progress of a computation and assessing the performance of a computational system. If a large number of labs is employed it will not generally be possible to view the entire list at once. If a particular status or activity is of interest, sorting the list by status or activity might be of some help. However, if status/activity values change rapidly, frequent reordering of the list could place a burden on display software and be disorienting to the observer. Grouping and displaying by activity or status resolves these problems by reserving a display area for each status or activity of interest and identifying, in a compact way, which processors are currently exhibiting that status or activity.

In such an embodiment, the simultaneous integrated view of the concurrent computing units is grouped and displayed according to activity status. Grouping and displaying by activity or status reserves a display area for each status or activity of interest and identifies, in a compact way, which processors are currently exhibiting that status or activity.

Figure 7A:
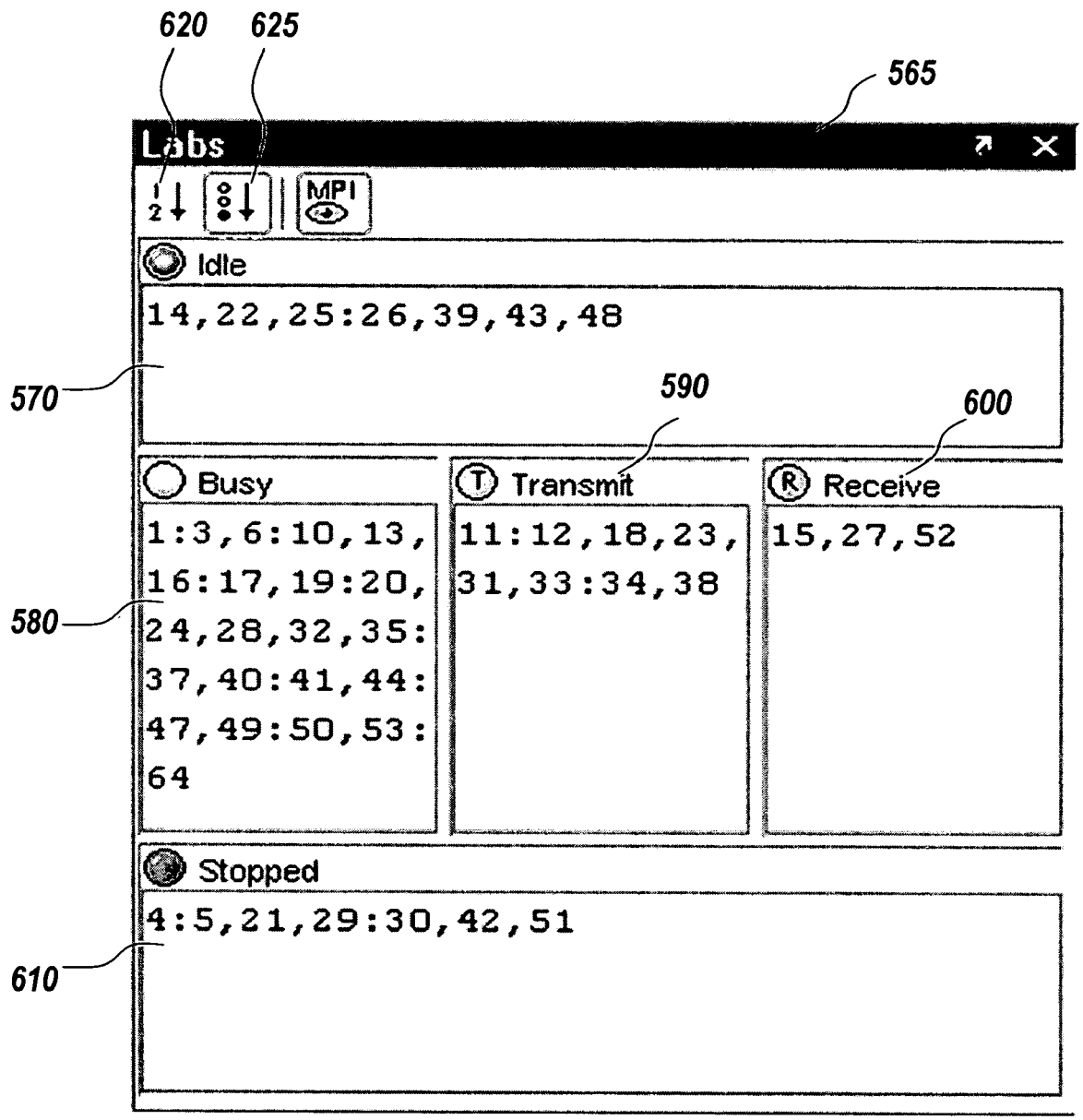
FIG. 7A depicts the graphical user interface of the present invention reflecting an integrated view of the status of the concurrent computing units arranged by groups.

FIG. 7A illustrates a more compact display 565 based on the status of the labs. Potential status or activity values include idle (no work to do) 570, busy performing a computation 580, busy sending data to another processor 590, busy receiving data from another processor 600 and stopped at a known execution point 610. Under each status/activity value is a list of the lab IDs currently exhibiting that status. In some embodiments a user may switch between the views of FIGS. 6A and 7A using menu buttons 620 and 625 that display the activity by lab 620 or group 625 respectively. In some embodiments when two or more successive lab IDs appear under the same status the range, low ID:high ID, appears rather than listing each ID. In other embodiments the listing of labs for each activity status may be ordered based on the duration the lab has been in that status. Other possible implementations and configurations will be apparent to one skilled in the art given the benefit of this disclosure. For example, the labs may include a link to additional information and previously identified labs of particular interest may be listed in different colors or shadings so as to make them more visible within a listed group. It should be noted that the present invention may also be implemented so as to provide multiple dimension indexing of labs instead of linear indexing. Additionally, labs may link to information on the computing device upon which they are running so that information on the processor, memory available as well as dynamic information such as processor utilization and memory usage may be displayed.

Figure 7B:
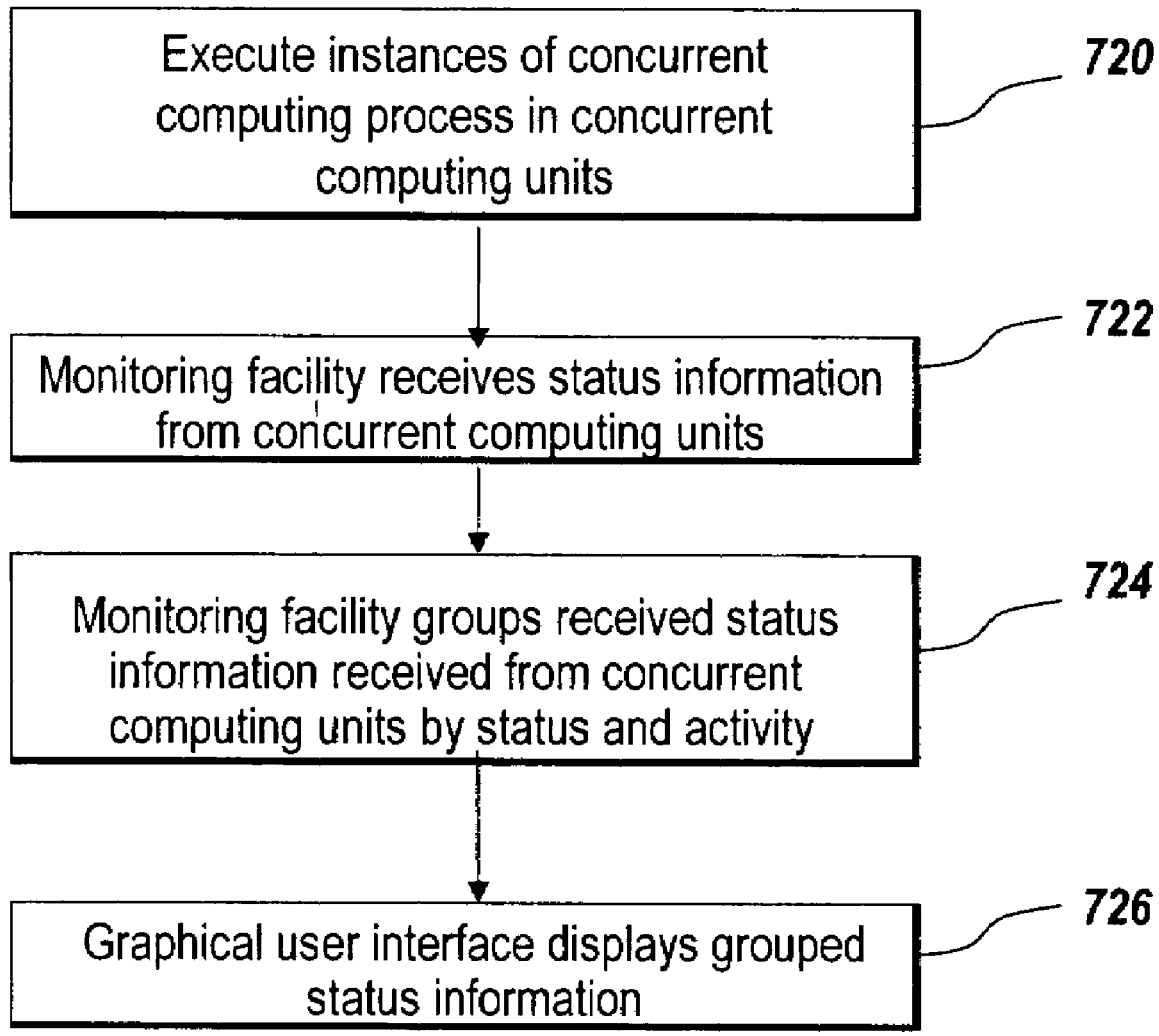
FIG. 7B is a flowchart of the sequence of steps by which the table of FIG. 7A is generated.

FIG. 7B is a flowchart of the sequence of steps by which the table of FIG. 7A is generated. The sequence begins by providing a concurrent computing process (step 720). A plurality of instances of the concurrent computing process is then executed in a plurality of concurrent computing units with each concurrent computing unit executing a separate instance of the concurrent computing process (step 722). A monitoring facility 252 receives periodic or continual updates as to the status of the concurrent computing process being executed in each concurrent computing unit (step 724). The information is then used to group the concurrent computing units into groups by at least one of a currently indicated status or activity (step 726). A graphical user interface is then generated to display the grouped status information for each concurrent computing unit (step 728).

Figure 8A:
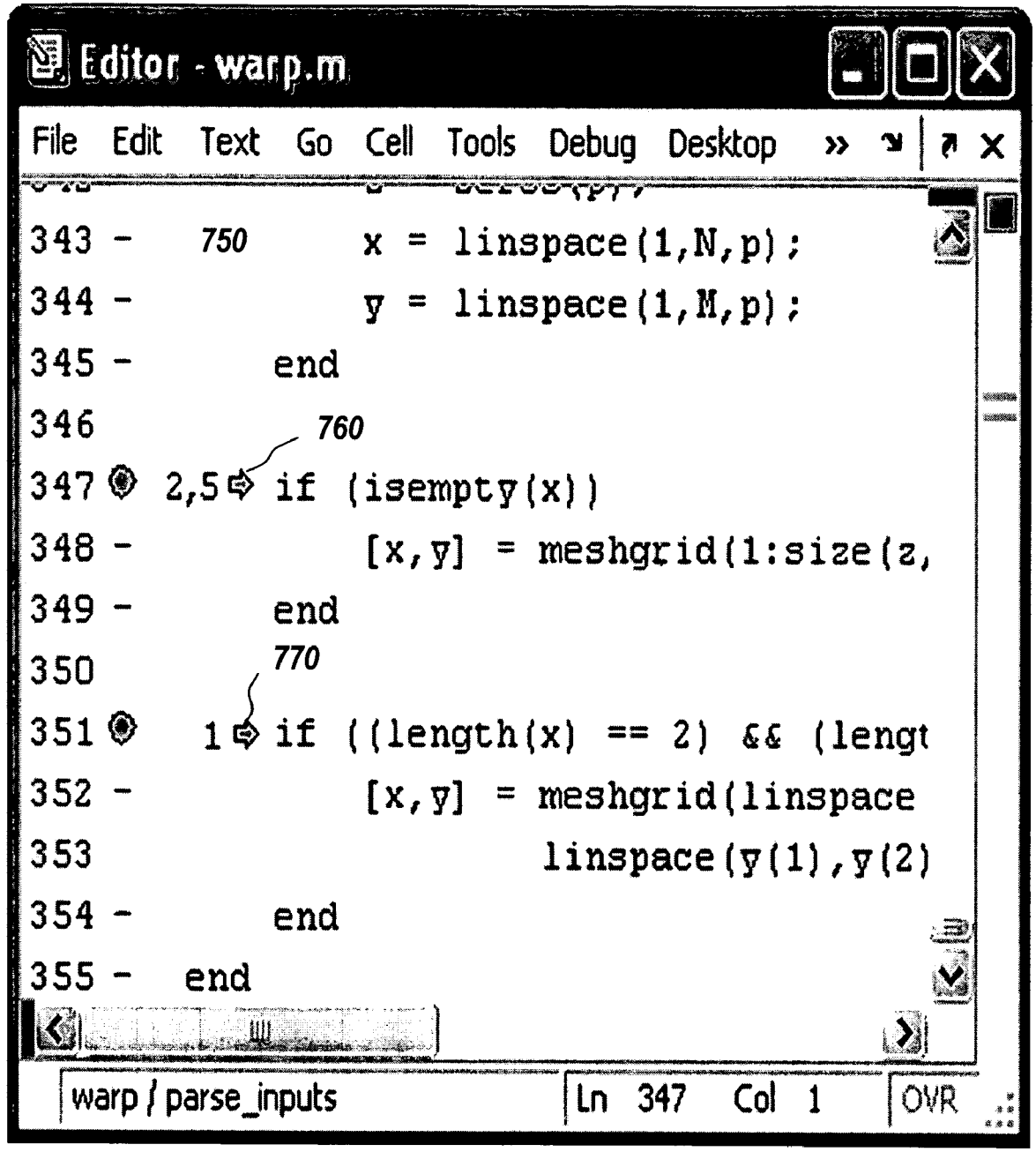
FIG. 8A depicts an embodiment wherein the graphical user interface of the present invention provides multiple indicator arrows showing where computing labs have stopped during execution.

In another aspect of the present invention, the provided graphical user interface includes graphical indicators that depict where multiple computing units or labs have stopped during execution. Thus, for debugging purposes, execution arrows are provided which indicate where the various processing units have stopped during execution of the code. An example of this can be seen in FIG. 8A. Here an editor window 750 is shown wherein there are visual indicators 760 and 770 that indicate where various labs stopped. In this example, execution arrow 760 indicates that labs '2' and '5' stopped at line 347. Execution arrow 770 indicates that lab '1' stopped at line 351. In some embodiments, when two or more successive lab IDs appear with the same indicator the range, low ID:high ID, may be used rather than listing each ID.

Alternatively, the graphical user interface may display separate overlapped windows for each lab as shown in FIG. 8B wherein the status of lab '2' is depicted in window 780 and the status of lab '5' is depicted in window 790. The GUI and the lab stopped at a breakpoint may share the same file system in which case the GUI directly retrieves the graphical debugging file for display. Alternatively, the GUI and the lab may share the same file even though the file is mapped differently or on a different file system. In such a case, the GUI may use its local copy for display. Alternatively, the GUI may have no access to the graphical debugging file in which case the lab transmit the file to the monitoring facility for display by the GUI. Other implementations and configuration will be apparent given the benefit of this disclosure.

It should be noted that although reference has been made herein to the practice of the illustrative embodiment of the present invention with a graphical user interface, other interface modalities may also utilized within the scope of the present invention.

The present invention may be provided as one or more computer-readable programs embodied on or in one or more computer-readable storage mediums. The mediums may be a floppy disk, a hard disk, a compact disc, a digital versatile disc, a flash memory card, a PROM, an MRAM, a RAM, a ROM, or a magnetic tape. In general, the computer-readable programs may be implemented in any programming language. Some examples of languages that can be used include MATLAB, FORTRAN, C, C++, C#, Python or Java. The software programs may be stored on or in one or more mediums as object code. Hardware acceleration may be used and all or a portion of the code may run on a FPGA, an ASIP, or an ASIC. The code may run in a virtualized environment such as in a virtual machine. Multiple virtual machines running the code may be resident on a single processor.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A computer-implemented method for monitoring the status of a concurrent computing process in an interactive concurrent computing environment having concurrent computing units, the method comprising:
    executing a plurality of instances of a concurrent computing process, each instance of the plurality of instances of the concurrent computing process executing on one of the concurrent computing units and performing a separate task, the plurality of instances of the concurrent computing process including at least one interactive instance of the concurrent computing process, the interactive instance accepting input from a user and displaying output to the user during execution of the plurality of instances of the concurrent computing process;
    receiving with a monitoring facility information indicating at least one of a current status and current activity for each of the plurality of concurrent computing units executing instances of the concurrent computing process;
    grouping each of the plurality of concurrent computing units into a group based on at least one of the indicated current status and current activity indicated by the information; and
    displaying the results of at least one grouping of the plurality of concurrent computing units.

2. The method of claim 1 wherein at least one of the concurrent computing units is a processor.

3. The method of claim 1 wherein the groupings identify any of the plurality of the concurrent computing units that are idle.

4. The method of claim 1 wherein the groupings identify any of the plurality of concurrent computing units that are busy.

5. The method of claim 4 wherein the groupings further identify any of the plurality of concurrent computing units that are busy performing a computation.

6. The method of claim 4 wherein the groupings further identify any of the plurality of concurrent computing units that are busy transmitting data to another concurrent computing unit.

7. The method of claim 4 wherein the groupings further identify any of the plurality of concurrent computing units that are busy receiving data from another concurrent computing unit.

8. The method of claim 1 wherein the groupings identify any of the plurality of concurrent computing units that are stopped.

9. The method of claim 1 wherein one or more of the instances of the concurrent computing processes originate from a program, at least a subset of the program written in a MATLAB-compatible language.

10. A system for monitoring the status of a concurrent computing process in an interactive concurrent computing environment, comprising:
    a plurality of concurrent computing units, each concurrent computing unit executing an instance of a concurrent computing process performing a separate task, at least one instance of the concurrent computing process being an interactive instance, the interactive instance accepting input from a user and displaying output to the user during execution of the instances of the concurrent computing process;
    a monitoring facility, the monitoring facility receiving information indicating at least one of a current status and current activity for each of the plurality of concurrent computing units executing instances of the concurrent computing process, the monitoring facility grouping each of the concurrent computing units into a group based on at least one of the indicated current status and current activity indicated by the information; and
    a graphical user interface displaying the group information from the monitoring facility that indicates at least one of the current status and current activity for each of the plurality of concurrent computing units.

11. The system of claim 10 wherein each of the concurrent computing units is a parallel computing unit.

12. The system of claim 10 wherein each of the concurrent computing units is a distributed computing unit.

13. The system of claim 10 wherein each of the concurrent computing units is a processor.

14. The system of claim 13 wherein the processor is at least one of a CPU, a core in a multi-core CPU, a field programmable gate array (FPGA), an application-specific integrated circuit (ASIC), a hardware accelerator, a cluster of processing units, and a grid of processing units.

15. The system of claim 10 wherein at least one of the concurrent computing units is a virtual computing unit.

16. A computer-readable storage medium for use with a computing device, the computer-readable storage medium holding computer-executable instructions for monitoring the status of a concurrent computing process in an interactive concurrent computing environment having concurrent computing units, the instructions when executed causing one or more computing devices to:
    execute a plurality of instances of a concurrent computing process, each instance of the plurality of instances of the concurrent computing process executing on one of the concurrent computing units and performing a separate task, the plurality of instances of the concurrent computing process including at least one interactive instance of the concurrent computing process, the interactive instance accepting input from a user and displaying output to the user during execution of the plurality of instance of the concurrent computing process;
    receive with a monitoring facility information indicating at least one of a current status and current activity for each of the plurality of concurrent computing units executing instances of the concurrent computing process;

group each of the plurality of concurrent computing units into a group based on at least one of the indicated current status and current activity indicated by the information; and generate a graphical user interface displaying the results of the groupings of the plurality of concurrent computing units.

17. The medium of claim 16 wherein at least one of the concurrent computing units is a processor.

18. The medium of claim 16 wherein the groupings identify any of the plurality of concurrent computing units that are idle.

19. The medium of claim 16 wherein the groupings identify any of the plurality of concurrent computing units that are busy.

20. The medium of claim 19 wherein the groupings further identify any of the plurality of concurrent computing units that are busy performing a computation.

21. The medium of claim 20 wherein the groupings further identify any of the plurality of concurrent computing units that are busy transmitting data to another concurrent computing unit.

22. The medium of claim 20 wherein the groupings further identify any of the plurality of concurrent computing units that are busy receiving data from another concurrent computing unit.

23. The medium of claim 16 wherein the groupings identify any of the plurality of concurrent computing units that are stopped.

24. The medium of claim 16 wherein one or more of the instances of the concurrent computing processes originate from a program, at least a subset of the program written in a MATLAB-compatible language.

25. A computer-implemented method for monitoring the status of a concurrent computing process in a concurrent computing environment having concurrent computing units, the method comprising:

monitoring the execution of a plurality of instances of a concurrent computing process, each instance of the plurality of instances of the concurrent computing process executing on one of the concurrent computing units and performing a separate task, the monitoring identifying information indicating at least one of a current status and current activity for each of the plurality of concurrent computing units executing instances of the concurrent computing process; and displaying a graphical user interface that includes and groups the information, the graphical user interface grouping at least one of the plurality of concurrent computing units into a group based on at least one of the indicated current status and current activity indicated by the information.

* * * * *

UNITED STATES PATENT AND TRADEMARK OFFICE
CERTIFICATE OF CORRECTION

| | | |
|---|---|---|
| PATENT NO. | : 7,631,168 B1 | Page 1 of 1 |
| APPLICATION NO. | : 11/497871 | |
| DATED | : December 8, 2009 | |
| INVENTOR(S) | : Peter D. Muellers et al. | |

It is certified that error appears in the above-identified patent and that said Letters Patent is hereby corrected as shown below:

On the Title Page, at Item (73) Assignee, replace "The Math Works, Inc." with
--The MathWorks, Inc.--.

Signed and Sealed this
Eighteenth Day of November, 2014

Michelle K. Lee
*Deputy Director of the United States Patent and Trademark Office*